United States Patent [19]

Blok

[11] 4,173,419
[45] Nov. 6, 1979

[54] ROTARY MIXER

[76] Inventor: Arie Blok, 1422 Overlea Dr., Dunedin, Fla. 33528

[21] Appl. No.: 858,776

[22] Filed: Dec. 8, 1977

Related U.S. Application Data

[63] Continuation-in-part of Ser. No. 703,126, Jul. 7, 1976, Pat. No. 4,062,776.

[51] Int. Cl.² ............................................. B01F 9/06
[52] U.S. Cl. ................................................. 366/228
[58] Field of Search ............... 366/220, 225, 226, 228, 366/229, 230, 233, 53, 54, 60, 213, 307

[56] References Cited

U.S. PATENT DOCUMENTS

| | | | |
|---|---|---|---|
| 706,334 | 8/1902 | Moore | 366/233 |
| 2,503,686 | 4/1950 | Raypholtz | 366/228 |
| 2,761,420 | 9/1956 | Mottet | 366/228 |
| 3,145,979 | 8/1964 | Madsen | 366/229 |
| 3,752,445 | 8/1973 | Nowak | 366/233 |
| 3,940,120 | 2/1976 | Miller | 366/228 |

*Primary Examiner*—Robert W. Jenkins
*Attorney, Agent, or Firm*—David E. Doughtery; William H. Holt

[57] ABSTRACT

A mixer comprising a rotary driven conical drum into a large end of which sludge and flocculating polymer are introduced, constitutes a contact chamber, and is equipped with baffles and weirs. The sludge and polymer are supplied to a large end of the drum and mixing is accomplished in the large end of the drum where the surface area of the drum is moving most rapidly. Thereafter the mixing action is slowed down by travel of the mixture to the smaller end of the drum, where the surface area of the drum is moving more slowly, to build up the flocs. The sludge/polymer mixture produced in the contact chamber is then discharged through a conduit into any of various types of dewatering devices such as sludge bags, sludge strainers, sludge presses, etc.

3 Claims, 4 Drawing Figures

U.S. Patent     Nov. 6, 1979     4,173,419
Fig. 1.
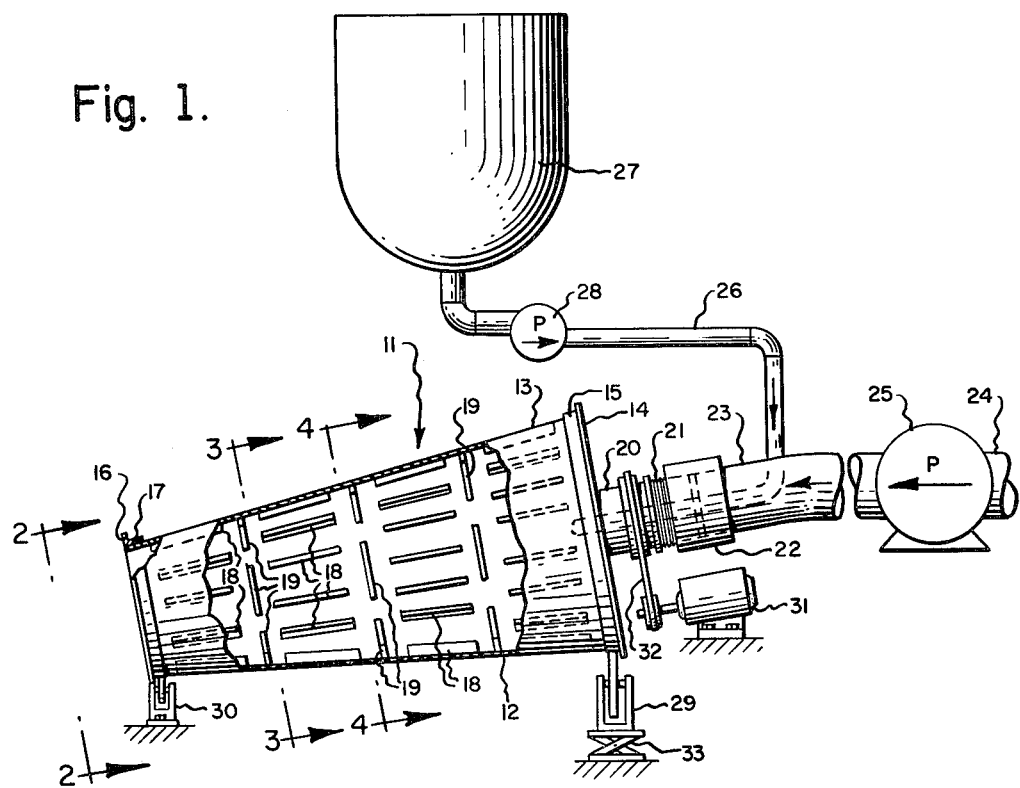
Fig. 2.
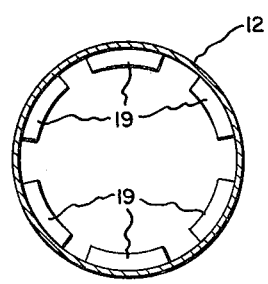
Fig. 3.
Fig. 4.

4,173,419

ROTARY MIXER

This is a continuation-in-part of Application Ser. No. 703,126, filed on July 7, 1976, and now U.S. Pat. No. 4,062,776.

SUMMARY

It is a primary object of the present invention to provide an apparatus capable of thoroughly mixing various liquids and solids, particularly sludge and flocculating polymers as part of a process for dewatering the sludge.

Another object of the invention is to provide an apparatus having a contact chamber for initially receiving sludge from a treatment plant and also for receiving a flocculating polymer and which is so constructed that a rapid mixing of the sludge and polymer will be initially accomplished, after which the mixing action will be gradually slowed down so that building up of the flocs will not be accomplished too rapidly, to thereby provide flocs which are strong enough to be pressed.

Various other objects and advantages of the invention will hereinafter becomes more fully apparent from the following description of the drawings, illustrating a presently preferred embodiment thereof.

BRIEF DESCRIPTION OF THE DRAWINGS

FIG. 1 is a fragmentary side elevational view of the rotary mixer and associated apparatus.

FIG. 2 is an enlarged end elevational view of the smaller discharge end of the mixer.

FIGS. 3 and 4 are enlarged fragmentary cross sectional views of the mixer taken substantially along planes as indicated by the lines 3—3 and 4—4, respectively, of FIG. 1.

DESCRIPTION OF THE PREFERRED EMBODIMENT

Referring to FIG. 1, a rotary mixer or sludge conditioner is generally indicated by the numeral 11. The mixer 11 in the form of a conical drum 12 includes an imperforate wall 13 extending from end to end thereof. A large end wall 14 has an annular flange 15 which engages over a large end of the conical wall 13. A ring 16 has an annular flange 17 which engages over the smaller end of the wall 13. The drum 12 is shown provided with four series of baffles 18. The baffles of each series are arranged in circumferentially spaced relationship to one another. A series of circumferentially spaced weirs 19 is interposed between the different series of baffles 18 and, like said baffles 18, are located internally of the drum 12. The number of baffles and weirs of each series diminishes from the large end wall 14 to the smaller end of wall 13.

A rigid tube 20 extends centrally through the end wall 14 and discharges into the interior of the drum 12. A flexible collar 21 is connected to and forms an extension of the exposed inlet end of the tube 20. A water tight rotary coupling 22 connects the collar 21 to the discharge end 23 of a conduit 24 which leads e.g., from a waste water treatment plant, now shown. A pump 25 is interposed in the conduit 24 for pumping the sludge or slurry from the treatment plant to the large inlet end of the mixer 11.

A pipe 26 leads from a container 27 for a flocculating polymer and has a portion thereof extending through the discharge end 23 of the conduit 24 and through the coupling 22, collar 21 and tube 20 and discharging into the large end of the mixer 11. All of the portions of the conduit 26 are located between the end wall 14 and pump 25. A pump 28 is interposed in the pipe 26 adjacent the container 27. The pumps 25 and 28 are of the positive displacement type, driven by variable speed motors.

A pair of spaced wheel units 29, the wheels of which engage the flange 15, support the larger end of the drum 12, and a second pair of wheel units 30, the wheels of which engage the flange 17, support the smaller end of the drum 12, to provide for rotation thereto. The drum 12 is revolved by a variable speed electric motor 31 which is connected to the tube 20 by a belt and pulley drive 32, one pulley of which is secured around the tube 20. The mixer 11 slopes downwardly from its large end wall 14 toward its smaller discharge end and its slope or incline may be varied by adjustment of jacks 33 which support the wheel units 29.

The residue from a waste water treatment plant, known as sludge, usually contains less than one percent of small particles which cannot be removed with a sieve or screen. This residue or sludge is discharged, with a flocculating polymer from the tank 27, into the mixer 11. The polymer draws these fine particles together. It is essential that the polymer be added to the sludge as fast as possible initially. Thereafter, the mixing action must be slowed down to build up the flocs which will be destroyed unless the mixing action is slowed down sufficiently. The flocs which are strong enough to be pressed are referred to as "sturdy flocs".

Since the sludge and polymer solution enters the large end 14 of the mixer 11, the surface speed of rotation of this end portion is at a maximum and as this end of the drum contains the most baffles 18 a maximum mixing will be accomplished. As the mixture moves over the weirs 19 to the smaller end of the mixer 11, the slower surface speed of rotation and the fewer available baffles 18 produces a gentler mixing action by means of which the flocs are carefully built up. This result could not be accomplished if it were not for the conical shape of the drum 12.

A desired sludge/polymer mixture is discharged from the open end 16 of the mixer 11.

Various modifications and changes are contemplated and may be resorted to, without departing from the function, spirit or scope of the invention as defined by the following claimed subject matter.

I claim:

1. A mixer comprising a frusto-conical drum having a large inlet end and a restricted open outlet end, means for supplying a mixture of sludge and a flocculating polymer to said inlet end, support means supporting said drum for rotation about a generally horizontal axis, and drive means for rotating said drum on said support means, said drum including an imperforate wall, a series of baffles mounted on said wall internally of said drum in circumferentially spaced relation to each other and extending longitudinally and generally radially inwardly of said drum for stirring said mixture of sludge and polymer while minimizing carrying of said mixture upwardly to the top of said drum during rotation thereof, said mixer being further characterized in that the number of baffles of each series diminishes from the inlet end to the outlet end for providing adjacent said outlet end a relatively gentle handling of flocs formed from said mixture as compared to the mixing action caused by said baffles adjacent said inlet end.

2. A mixer comprising a frusto-conical drum having a large inlet end and a restricted open outlet end, means for supplying a mixture of sludge and a flocculating polymer to said inlet end, support means supporting said drum for rotation about a generally horizontal axis, and drive means for rotating said drum on said support means, said drum including an imperforate wall, a series of baffles mounted on said wall internally of said drum in circumferentially spaced relation to each other and extending longitudinally and generally radially inwardly of said drum for stirring said mixture of sludge and polymer while minimizing carrying of said mixture upwardly to the top of said drum during rotation thereof, further characterized by a series of circumferentially extending weirs mounted internally on said wall, each weir in each of said series being circumferentially spaced from an adjacent weir for providing space for said mixture to move longitudinally along a lower portion of said drum toward said outlet end during rotation of said drum.

3. A mixer comprising a frusto-conical drum having a large inlet end and a restricted open outlet end, means for supplying a mixture of sludge and a flocculating polymer to said inlet end, support means supporting said drum for rotation about a generally horizontal axis, and drive means for rotating said drum on said support means, said drum including an imperforate wall, a series of baffles mounted on said wall internally of said drum in circumferentially spaced relation to each other and extending longitudinally and generally radially inwardly of said drum for stirring said mixture of sludge and polymer while minimizing carrying of said mixture upwardly to the top of said drum during rotation thereof, further characterized by a series of circumferentially extending weirs mounted internally on said wall, each weir in each of said series being circumferentially spaced from an adjacent weir for providing space for said mixture to move longitudinally along a lower portion of said drum toward said outlet end during rotation of said drum, and further characterized in that the number of baffles of each series diminishes from the inlet end to the outlet end for providing adjacent said outlet end a relatively gentle handling of flocs formed from said mixture as compared to the mixing action caused by said baffles adjacent said inlet end.

* * * * *